United States Patent [19]

Hickner et al.

[11] Patent Number: 4,608,313
[45] Date of Patent: Aug. 26, 1986

[54] ADVANCED EPOXY RESINS CROSSLINKED WITH POLYISOCYANATES

[75] Inventors: Richard A. Hickner, Lake Jackson; Kevin A. Owens, Katy; Gwendolyn M. Grays, Sugarland, all of Tex.

[73] Assignee: The Dow Chemical Company, Midland, Mich.

[21] Appl. No.: 750,629

[22] Filed: Jun. 26, 1985

Related U.S. Application Data

[63] Continuation-in-part of Ser. No. 640,268, Aug. 13, 1984, abandoned, which is a continuation-in-part of Ser. No. 499,097, May 27, 1983, abandoned, which is a continuation-in-part of Ser. No. 393,969, Jun. 10, 1982, abandoned.

[51] Int. Cl.$^4$ .............................................. C08G 3/58
[52] U.S. Cl. .................................. 428/414; 523/400; 525/528; 528/45; 528/73; 528/103
[58] Field of Search .................. 528/103, 104, 45, 73; 525/528; 523/400; 428/414

[56] References Cited

U.S. PATENT DOCUMENTS

| | | | |
|---|---|---|---|
| 2,952,560 | 4/1952 | Greenlee | 528/87 |
| 3,336,257 | 8/1967 | Alvey | 528/104 X |
| 3,346,532 | 10/1967 | Greene et al. | 528/104 X |
| 3,350,353 | 10/1967 | Alvey | 528/87 X |
| 3,445,429 | 5/1969 | Sellers | 528/103 X |
| 3,547,881 | 12/1970 | Mueller et al. | 260/47 |
| 3,634,323 | 1/1972 | Moran | 528/104 X |
| 3,746,545 | 7/1973 | Pollet et al. | 96/66.3 |
| 3,817,918 | 6/1974 | Aufdermarsh, Jr. | 260/47 EP |
| 3,824,212 | 7/1974 | Sinnema et al. | 260/47 EP |
| 4,031,050 | 6/1977 | Jerabek | 525/528 X |
| 4,101,486 | 7/1978 | Bosso et al. | 525/528 X |
| 4,122,067 | 10/1978 | Anderson | 528/89 |

FOREIGN PATENT DOCUMENTS

| | | |
|---|---|---|
| 675171 | 7/1952 | United Kingdom . |
| 887996 | 1/1962 | United Kingdom . |
| 893912 | 4/1962 | United Kingdom . |
| 986204 | 3/1965 | United Kingdom . |
| 1398197 | 6/1975 | United Kingdom . |
| 1527258 | 10/1978 | United Kingdom . |
| 2001324 | 1/1979 | United Kingdom . |

Primary Examiner—Earl Nielsen
Attorney, Agent, or Firm—J,. G. Carter

[57] ABSTRACT

Coatings are prepared from epoxy resin compositions prepared by reacting an epoxy resin composition containing an aliphatic diepoxide with a dihydric phenol. These coatings are useful as anti-chip coatings for automobiles and as coil coatings.

21 Claims, No Drawings

ADVANCED EPOXY RESINS CROSSLINKED WITH POLYISOCYANATES

CROSS REFERENCE TO RELATED APPLICATION

This is a continuation-in-part of copending application Ser. No. 640,268 filed August 13, 1984 (now abandoned) which is a continuation-in-part of Ser. No. 499,097 filed May 27, 1983 (now abandoned) which is a continuation-in-part of Ser. No. 393,969 filed June 10, 1982 (now abandoned).

BACKGROUND OF THE INVENTION

The present invention concerns advanced epoxy resins and coatings containing same.

Automotive manufacturers are being required by Federal mandate to reduce volatile organic emissions from the paint operations. Increased emphasis on quality has caused manufacturers to install chip resistant coatings between the primer and top coat to resist damage by stone chipping. These stone chips are esthetically unpleasing and can also lead to rusting. Presently used antichip coatings tend to be low in solids and frequently require the use of heating equipment to reduce the viscosity for proper applications.

Coil coating has become an increasingly important method for applying industrial coatings. In this method a metal coil, usually steel or aluminum, is ordinarily coated and the substrate is then post-formed into the final object. Such a coating requires a high degree of flexibility and elongation. Conventional epoxy resins are widely used as primers for these applications. These resins are typically based on the diglycidyl ether of bisphenol A advanced with bisphenol. Typical resins have an epoxide equivalent weight of about 1800–2000. Such resins, however, are lacking where extreme flexibility is required. While resins in the 3000–5000 epoxide equivalent range will give improved flexibility, large amounts of solvent are required to obtain the proper application viscosity. Similar problems are encountered with other applications requiring high flexibility and high formability such as can ends.

The present invention provides high solids coating compositions having improved flexibility and resistance to stone chipping relative to known compositions.

SUMMARY OF THE INVENTION

The present invention is directed to a coating composition comprising (I) an advanced epoxy resin prepared by reacting in the presence of a suitable catalyst
  (A) a composition comprising
    (1) at least one aliphatic diepoxide and
    (2) optionally at least one aromatic diepoxide; with
  (B) at least one compound having two aromatic hydroxyl groups per molecule and an average molecular weight of at least about 188; wherein components (A-1) and (A-2) are employed in quantities such that from about 10 to about 100, preferably from about 50 to about 100, most preferably from about 75 to about 100 percent of the epoxide equivalents contained in component (A) are contributed by component (A-1); from about 0 to about 90, preferably from about 0 to about 50, most preferably from about 0 to about 25 percent of such epoxide equivalents are contributed by component (A-2) and wherein components (A) and (B) are employed in quantities which provide an advanced epoxy resin having an epoxide equivalent weight (EEW) of from about 350 to about 15,000, preferably from about 500 to about 7500, most preferably from about 500 to about 6000;

(II) a curing quantity of at least one curing agent for component (I) selected from the group consisting of blocked and unblocked polyisocyanates; and (III) at least one solvent in a sufficient quantity such that the coating composition including components (I), (II) and (III) and any other desirable components has a suitable application viscosity.

DETAILED DESCRIPTION OF THE PREFERRED EMBODIMENTS

Suitable aliphatic diepoxides which can be employed herein include the diglycidyl ethers of dihydric aliphatic compounds such as, for example, water, propylene glycol, dipropylene glycol, tripropylene glycol, butylene glycol, dibutylene glycol, tributylene glycol, 1,4-butane diol, 1,6-hexane diol, neopentyl glycol, mixtures thereof and the like.

Also suitable are the glycidyl ethers of polyoxyalkylene glycols having an average molecular weight of from about 200 to about 800, preferably from about 200 to about 400, which polyoxyalkylene glycols are prepared by reacting an aliphatic initiator compound with propylene oxide, butylene oxide or mixtures thereof.

Suitable aromatic diepoxides which can be employed herein include the diglycidyl ethers of polyhydric phenols such as, for example, catechol, resorcinol, hydroquinone, bisphenol A, mixtures thereof and the like.

Particularly suitable diglycidyl ethers of bisphenols and dihydric phenols which can be employed herein include those mentioned by P. H. Martin in U.S. 3,931,109 which is incorporated herein by reference.

Suitable compounds having two aromatic hydroxyl groups per molecule which can be employed herein include, for example, those represented by the formula

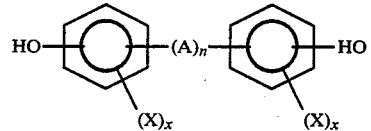

wherein A is a divalent hydrocarbyl group having from 1 to about 10 carbon atoms,

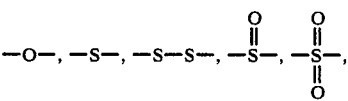

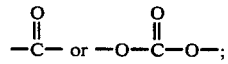

each X is independently a monovalent hydrocarbyl group having from 1 to about 10 carbon atoms or a halogen; n has a value of zero or 1; and x has a value of from zero to 4.

Suitable such phenolic hydroxyl-containing compounds include, for example, bisphenol A, bisphenol K, bisphenol S, tetramethylbisphenol A, tetratertiarybutylbisphenol A, tetrabromobisphenol A, 4,4'-dihydroxybiphenyl, 3,5,3',5'-tetramethyl-4,4'-dihydroxybiphenyl, 3,5,3'5'-tetrabromodihydroxybiphenyl, 3,5,3',5'-tetramethyl-2,6,2',6'tetrabromo-4,4'-dihydroxybiphenyl, mixtures thereof and the like.

It is to be understood, that because of the manner in which the commercial epoxy resins prepared from aliphatic dihydric compounds and aromatic dihydric compounds are prepared, these epoxy resins contain minor amounts of monoglycidyl ether products. However, so long as less than about 10 percent of the epoxy groups are derived from such monoglycidyl ether products, they are suitable. Suitable such commercially available diglycidylethers of aromatic dihydric compounds include D.E.R. ® 330, D.E.R. ® 331, D.E.R. ® 332 and D.E.R. ® 383 commercially available from The Dow Chemical Company as well as EPON ® 825, EPON ® 826 and EPON ® 828 commercially available from Shell Chemical Company.

Suitable commercially available diglycidyl ethers of aliphatic dihydric compounds include D.E.R. ® 732 and D.E.R. ® 736 available from The Dow Chemical Company, and ARALDITE ® RD-2 commercially available from Ciba-Geigy.

The quantities of the aliphatic and aromatic epoxy resins and the compound containing two aromatic hydroxyl groups to be employed are those quantities which will provide the desired average epoxide equivalent weight of the advanced epoxy resin.

The percent of aliphatic diepoxide depends upon the particular end use for which the advanced epoxy resin is to be employed.

For example, in automotive primer coatings, the desired percent aliphatic diepoxide is from about 10% to about 30% by weight based upon the combined weight of the aliphatic diepoxide and the aromatic diepoxide and the epoxide equivalent weight of the advanced resin is usually from about 350 to about 700.

For applications as automotive chip resistant coatings, the desired percent aliphatic diepoxide is from about 70% to about 100% and the epoxide equivalent weight of the advanced epoxy resin is from about 1200 to about 6000.

For beverage can coating applications, the desired percent of aliphatic diepoxide is from about 10% to about 100% and the epoxide equivalent weight of the advanced resin is from about 1400 to about 5000.

For coil coating applications, the desired percent of aliphatic diepoxide is from about 10% to about 100% and the epoxide equivalent weight of the advanced epoxy resin is from about 1400 to about 6000.

Suitable solvents which can be employed herein include, for example, ketones such as acetone, methylethyl ketone, methyl n-amyl ketone, methyl isobutyl ketone; glycol ethers such as, for example, the methyl ether of diethylene glycol, the methyl ether of propylene glycol, the n-butyl ether of ethylene glycol; and esters such as for example, ethyl acetate, butyl acetate, the acetate ester of the monomethyl ether of propylene glycol, and the like.

Suitable solvents also include aromatic compounds, such as, for example, toluene, xylene and the like. It is also understood that mixtures of such solvents can be employed.

Suitable catalysts which can be employed herein in preparing the advanced epoxy resins of the present invention, include any such catalyst suitable for catalyzing the reaction between an epoxy group and a phenolic hydroxyl group. Particularly suitable catalysts include those phosphonium catalysts described by W. O. Perry in U.S. Pat. No. 3,948,855 and Dante et al. in U.S. Pat. No. 3,447,990 which are incorporated herein by reference.

The curing agents employed in the coating compositions of the present inventions include, polyisocyanates and blocked polyisocyanates. Suitable such isocyanates include, for example, tolylene diisocyanate, 4,4'-diphenylmethaneisocyanate and its liquid derivatives, some examples of which are sold under the tradenames of Rubinate LF-168 or Rubinate LF-179 by Rubinate Chemicals Inc. of Wilmington, Del. or Isonate 143L or Isonate 181 by Upjohn Polymer Chemicals of LaPorte, Tex., a biuret or isocyanurate from hexamethylene diisocyanate, and a cyclic trimer of hexamethylene diisocyanate and tolylene diisocyanate. The isocyanates may also be prepolymers of the aforementioned isocyanates and polyols such as polypropylene glycols, triols such as trimethylpropane or glycerine or their reaction products with propylene oxide or butylene oxide having hydroxyl equivalent weights from about 85 to about 1000. The isocyanates can be blocked with phenols such as phenol, 4-chlorophenol, o-secbutylphenol, lactams such as caprolactam and ketoximes or aldoximes such as acetaldehyde oxime or methyl ethyl ketoxime. Coatings capable of curing at room temperature can be obtained by use of the aforementioned isocyanates which contain no blocking agent. From an industrial standpoint the blocked isocyanates are preferred since they will provide one package systems. The ketoxime and lactam blocked isocyanates are preferred from an ecology standpoint and providing the appropriate cure temperatures.

The coating compositions of the present invention may also contain, if desired, colorants, dyes, pigments, fillers, leveling agents, mixtures thereof and the like.

Suitable substrates to which the coating compositions can be applied include, for example, metals such as, for example, aluminum, steel and the like, laminates and composites such as, for example, fiber reinforced plastics such as, for example, polyesters, vinyl esters, epoxy resins and the like.

In the paint of automobiles, the first or primer coating layer is usually composed of a cationic epoxy resin coating composition. After the anti-chip coating composition of the present invention is applied to the primer coating, there is then applied one or more coating layers which can be polyester coatings, epoxy resin coatings, acrylic coatings or combinations thereof.

In metal coil coatings, the coating composition of the present invention is the first layer applied to the substrate. Thereafter, additional coating layers of a coating of any suitable composition can be applied such as, for example, polyester coatings, acrylic coatings, alkyd coatings or combinations thereof.

The following examples are illustrative of the present invention, but are not to be construed as to limiting the scope thereof in any manner.

The following components were employed in the examples.

ALIPHATIC DIEPOXIDE A was a diglycidyl ether of dipropylene glycol having an average EEW of about 176.

ALIPHATIC DIEPOXIDE B was a diglycidyl ether of polyoxypropylene glycol having an average molecular weight of 425. The EEW of this resin was 300.

AROMATIC DIEPOXIDE A was a diglycidyl ether of bisphenol A having an average EEW of about 189.
DIHYDRIC PHENOL A was bisphenol A.

EXAMPLE 1

An advanced resin having an average EEW of about 1800 was prepared by reacting 324.8 grams (1.845 epoxide equivalents) of aliphatic diepoxide A and 175.2 grams (1.537 phenolic OH equivalents) of bisphenol A in the presence 0.461 grams of a 70% solution of ethyltriphenyl phosphonium acetate.acetic acid complex in methanol. The peak exotherm was about 200° C. and heating was continued thereafter at about 175° C. for 1.5 hours (5400 s). The resultant product was diluted to 80% solids by weight with the monomethyl ether of propylene glycol. A 408 g sample of the 80% solids solution was diluted to 70% solids by the addition of 63.6 g of 2-methoxypropanol acetate. The resultant solution had a Gardner viscosity of Z+ (~2300 cps.) at 25° C.

EXAMPLE 2

A. Example 1 was repeated employing 243.6 grams (1.38 epoxide equivalents) of aliphatic diepoxide A (75 wt. %), 81.2 grams (0.43 epoxide equivalents) of aromatic diepoxide A (25 wt. %) and 175.2 grams (1.537 phenolic hydroxyl equivalents) of bisphenol A and 0.464 grams of catalyst solution. The peak exotherm was observed to be 204° C. A sample of the resin at 80% solids was diluted further with 2-methoxypropanol acetate to give a 60% solids solution. This solution had a Gardner viscosity of X-Y at 25° C.

B. Similar products were prepared using blends of 50% of aliphatic diepoxide A and 50% of aromatic diepoxide A.

EXAMPLE 3

Preparation of Methyl Ethyl Ketoxime Blocked Prepolymer

A one-liter five-necked flask was charged with 174.2 g (2.0 eq.) of 80/20, 2,4-,2,6-tolylene diisocyanate. The flask was heated to 50° C. and 205 g (1.0 eq.) of a polyoxypropylene glycol having an average molecular weight of about 425 containing 0.87 g of dibutyl tin dilaurate solution (20% solids in methyl ethyl ketone) was added during 35 minutes (2100 s) while maintaining the temperature at 65°–73° C. Fifty grams of methyl ethyl ketone was added to facilitate stirring. Heating was continued an additional 40 minutes (2400 s) at 55° C. Methyl ethyl ketoxime (87.1 g, 1.0 eq.) was added over a 20 minute (1200 s) period while applying cooling to keep the temperature below 55° C. An additional 25 g of methyl ethyl ketone and 25 g of 2-methoxypropanol was added to give a total of 100 g of solvent or 82.3% solids. The product was a deep yellow liquid which partially crystallized on standing. A 410 g sample at 82.3% solids was diluted further with 79.5 g methyl ethyl ketone and 18 g of 2-methoxypropanol to give a 77.5% solids solution.

EXAMPLE 4

The products of Examples 1 and 2 were compared to an epoxy resin of about 1800 epoxide equivalent weight prepared only from an aromatic diepoxide A and sold commercially as D.E.R. ® 667. The epoxy resins were blended at the ratio of 100 parts of epoxy resin to 50 parts of the blocked isocyanate of Example 3 (solids basis) and 1 part of dibutyl tin dilaurate (T 12 catalyst) per 100 parts of blocked isocyanate.

Films were drawn down on unpolished cold rolled steel panels using a number 40 wire wound rod and baked for 30 minutes (1800 s) at 300° F. or 275° F. The films were evaluated for MEK double rubs, reverse impact and X-adhesion. The latter test was performed by scribing an X on a panel with a razor blade and pulling with Scotch Brand 610 tape. A pass represents no loss of adhesion whereas a fail indicates removal of film from all four quadrants of the X-batch. The results are tabulated in Table I.

This example demonstrates that up to about 50 percent of the aliphatic diepoxide may be replaced by an aromatic diepoxide and still maintain excellent flexibility and increased solids (non-volatiles) content at suitable application viscosities relative to a coating derived from 100% aromatic diepoxide.

TABLE I

| EVALUATION OF 1800 EEW RESINS WITH BLOCK ISOCYANATE | | | | |
|---|---|---|---|---|
| EPOXY RESIN | SAMPLE 1 | SAMPLE 2 | SAMPLE 3 | SAMPLE 4 |
| ALIPHATIC DIEPOXIDE A, % | 100 | 75 | 50 | 0 |
| AROMATIC DIEPOXIDE A, % | 0 | 25 | 50 | 100 |
| EEW OF ADVANCED RESIN | 1765[1] | 1900[2] | 1765[2] | 1775[3] |
| EPOXY SOLIDS, pbw | 80.0 | 72.9 | 73.3 | 70.0 |
| EPOXY SOLUTION, pbw | 114.3 | 121.5 | 122.2 | 140.0 |
| BLOCKED NCO SOLIDS[4], pbw | 40.0 | 36.5 | 36.6 | 35.0 |
| BLOCKED NCO SOLUTION, pbw | 51.6 | 47.1 | 47.2 | 45.1 |
| T-12 CATALYST[5], pbw | 4.0 | 3.6 | 3.7 | 3.5 |
| % SOLIDS OF BLEND | 70.8 | 64.4 | 64.3 | 57.9 |
| GARDNER VISCOSITY OF BLEND | Y-Z | X-Y | Z | Z-1 |
| VISCOSITY, CPS OF BLEND | ~1900 | ~1500 | ~2300 | ~2700 |
| CURE 1800 s @ 300° F. | | | | |
| REVERSE IMPACT, in.-lbs. | P160 | P160 | P160 | P80, F100 |
| MEK RUBS | 15 | 17 | 45 | 75 |
| ADHESION | PASS | PASS | PASS | FAIL 25% |
| CURE 1800 s @ 275° F. | | | | |
| REVERSE IMPACT, in.-lbs. | P160 | P160 | P80, F100 | F40 |
| MEK RUBS | 15 | 13 | 25 | 65 |
| ADHESION | PASS | FAIL | FAIL | FAIL |

[1]Prepared in Example 1
[2]Prepared in Example 2
[3]A commercially available aromatic epoxy resin based upon bisphenol A sold by The Dow Chemical Company as D.E.R. ® 667
[4]Prepared in Example 3
[5]10% solids in methyl ethyl ketone

EXAMPLE 5

A. Employing the procedure of Example 1, an advanced epoxy resin was prepared from 2080 g (11.82 eq.) of aliphatic diepoxide A and 1233 g (10.8 eq.) of bisphenol A. The resultant resin had an EEW of 3230 (100% solids basis).

B. Employing the procedure of Example 1, an advanced epoxy resin was prepared from 404 g (1.37 eq.) of aliphatic diepoxide B and 96 g (0.84 eq.) of bisphenol A. The resultant resin had an EEW of 1010 (100% solids basis).

C. Employing the procedure of Example 1, an advanced epoxy resin was prepared from 1149 (3.83 eq.) of aliphatic diepoxide B and 350.5 g (3.07 eq.) of bisphenol A. The resultant resin had an EEW of 1863 (100% solids basis).

D. Employing the procedure of Example 1, an advanced epoxy resin was prepared from 148.9 g (0.496 eq.) of aliphatic diepoxide B and 51.1 g (0.448 eq.) of bisphenol A. The resultant resin had an EEW of 3333 (100% solids basis).

E. Employing the procedure of Example 1, an advanced epoxy resin was prepared from 884.8 g (2.95 eq.) of aliphatic diepoxide B and 337.4 g (2.96 eq.) of bisphenol A. The resultant resin had an EEW of 5500 (100% solids basis). The preparation employed 4 g of tetrabutyl phosphonium acetate.acetic acid complex instead of ethyltriphenyl phosphonium acetate.acetic acid complex as a catalyst.

EXAMPLE 6

Preparation of Blocked Isocyanate

The general procedure of Example 3 was followed. Insonate 191 (340.5 g, 2.5 eq.), a modified 4,4'-methylenediphenyl diisocyanate available from Upjohn Polymer Chemicals, LaPorte, Tex. was placed in a flask. Methyl ethyl ketoxime (219.2 g, 2.52 eq.) was added dropwise while maintaining the temperature below about 60° C. When about two-thirds of the methyl ethyl ketoxime had been added, 139.9 g of 2-methoxypropanol acetate was added to facilitate stirring. When the ketoxime addition was complete, an additional 99 g of solvent was added to produce a 70% solids solution. The solution was heated an additional hour at 60° C. The final product was a brown liquid with a Gardner viscosity of Z (~22.7 poise) at 23° C.

EXAMPLE 7

Coating compositions were prepared from the various advanced epoxy resins prepared in Examples 1, 2 and 5 in the following manner.

Melamine Systems—The flexible resin solutions were blended with 30 g (30 PHR) of Resimine 755 (a melamine-formaldehyde available from Monsanto Co., St. Louis, Mo.), 2 weight percent (based on epoxy resin solids) of Cycat 4040 (a 40 percent solids solution of p-toluenesulfonic acid in isopropyl alcohol). The solutions were diluted with an equal weight blend of n-butyl alcohol, xylene and aromatic 100 to application viscosity. Films were drawn down on Bonderite 40 test panels using a doctor blade. The coatings were cured for 15 minutes (900 s) at 300° F. (149° C.).

Blocked Isocyanate Systems—The flexible resin solutions were blended with 0.35 equivalents of the blocked isocyanate of Example 6 per hydroxyl equivalent of epoxy resin. Epoxy resins in Samples 1–6 were considered to have a hydroxyl equivalent weight of approximately 330 while resins in Samples 7–16 were considered to have a hydroxyl equivalent weight of approximately 440. One percent of UL 28 catalyst (dimethyl tin dilaurate from Argus Chemical, Chicago, Ill.) based on epoxy resin solids was added. The solutions were diluted similar to the melamine coatings.

The results are given in the following Table II.

TABLE II

|  | SAMPLE 1 | SAMPLE 2 | SAMPLE 3 | SAMPLE 4 | SAMPLE 5 | SAMPLE 6 | SAMPLE 7 | SAMPLE 8 |
|---|---|---|---|---|---|---|---|---|
| EPOXY RESIN | | | | | | | | |
| ALIPHATIC DIEPOXIDE A, % | 50 | 50 | 75 | 75 | 100 | 100 | 0 | 0 |
| ALIPHATIC DIEPOXIDE B, % | 0 | 0 | 0 | 0 | 0 | 0 | 100 | 100 |
| AROMATIC DIEPOXIDE A, % | 50 | 50 | 25 | 25 | 0 | 0 | 0 | 0 |
| EEW OF ADVANCED RESIN | 1765 | 1765 | 1900 | 1900 | 1765 | 1765 | 3230 | 3230 |
| CURING AGENT | | | | | | | | |
| BLOCKED ISOCYANATE | No | Yes | No | Yes | No | Yes | No | Yes |
| AMINOPLAST | Yes | No | Yes | No | Yes | No | Yes | No |
| THICKNESS, mils | 2.3–2.5 | 2.2–2.5 | 1.6–2.0 | 2.5–2.7 | 1.8–2.0 | 2.5–2.8 | 3.0–3.2 | 0.8–1.0 |
| , mm | 0.059–0.064 | 0.056–0.064 | 0.041–0.051 | 0.064–0.069 | 0.046–0.051 | 0.064–0.071 | 0.076–0.081 | 0.020–0.025 |
| REVERSE IMPACT | | | | | | | | |
| In/lbs | 4 | 160 | 8 | 160 | 15 | 160 | 10 | 160 |
| Joules | .452 | 18.08 | .904 | 18.08 | 1.695 | 18.08 | 1.13 | 18.08 |
| MANDREL BEND | | | | | | | | |
| in. of failure | 3.7 | 0 | 2.5 | 0 | 0 | 0 | 0 | 0 |
| mm. of failure | 9.4 | 0 | 6.3 | 0 | 0 | 0 | 0 | 0 |
| Elongation, % | 4.5 | 32 | 6 | 32 | 32 | 32 | 32 | 32 |

|  | SAMPLE 9 | SAMPLE 10 | SAMPLE 11 | SAMPLE 12 | SAMPLE 13 | SAMPLE 14 | SAMPLE 15 | SAMPLE 16 |
|---|---|---|---|---|---|---|---|---|
| EPOXY RESIN | | | | | | | | |
| ALIPHATIC DIEPOXIDE A, % | 0 | 0 | 0 | 0 | 0 | 0 | 0 | 0 |
| ALIPHATIC DIEPOXIDE B, % | 100 | 100 | 100 | 100 | 100 | 100 | 100 | 100 |
| AROMATIC DIEPOXIDE A, % | 0 | 0 | 0 | 0 | 0 | 0 | 0 | 0 |

TABLE II-continued

| | | | | | | | | |
|---|---|---|---|---|---|---|---|---|
| EEW OF ADVANCED RESIN | 1010 | 1010 | | | | | | |
| CURING AGENT | | | | | | | | |
| BLOCKED ISOCYANATE | No | Yes | No | Yes | No | Yes | No | Yes |
| AMINOPLAST | Yes | No | Yes | No | Yes | No | Yes | No |
| THICKNESS, mils | 3.75–4.0 | 1.8–2.0 | 3.0–3.5 | 1.1–1.2 | 3.4–3.6 | 1.5–1.6 | 3.9–4.0 | 0.6–1.1 |
| , mm | 0.095–0.012 | 0.046–0.051 | 0.076–0.089 | 0.028–0.030 | 0.086–0.091 | 0.038–0.041 | 0.010–0.102 | 0.015–0.028 |
| REVERSE IMPACT | | | | | | | | |
| In/lbs | T* | T | 20 | 160 | 40 | 160 | 50 | 160 |
| Joules | 0 | 0 | 2.26 | 18.08 | 4.52 | 18.08 | 5.65 | 18.08 |
| MANDREL BEND | | | | | | | | |
| in. of failure | T | T | 3.6 | 0 | 2.9 | 0 | 3.3 | 0 |
| mm. of failure | 0 | 0 | 9.1 | 0 | 7.4 | 0 | 8.4 | 0 |
| Elongation, % | T | T | 4.5 | 32 | 5 | 32 | 4.7 | 32 |

*T = coating was tacky and not evaluated

EXAMPLE 8

The solutions of Example 7, the pigments and solvents were placed in a 4 oz. glass jar. Steel shot was added, the glass bottles carefully packed in a steel paint can, and the container agitated on a paint shaker to effect a suitable dispersion. The steel shot was filtered off using a paint filter. The pigment blend consisted of 20 parts of titanium dioxide and 80 parts of barytes. The ratio of pigment to binder was 0.3 to 1.

The coatings were evaluated for anti-chip resistance according to the following method.

Bonderite 40 treated 22 guage steel panels were obtained from Advanced Coating Technology, Hillsdale, Mich. The panels as received were treated with a cathodic electrodeposition primer from PPG Industries, Pittsburgh, Pa. designated Uniprime 3150. The anti-chip coatings described above were applied to various thicknesses using a draw down bar. The anti-chip coatings were given a prebake for 15 minutes (900 s) at 180° F. (82° C.) followed by 15 minutes (900 s) at 300° F. (149° C.). A commercially available white enamel top coat was spray applied at 1.5–2.0 mils dry film thickness and baked for 15 minutes (900 s) at 275° F. (135° C.). The panels were evaluated for chip resistance according to SAE Test Procedure J 400 except the tests were conducted at room temperature.

The results are given in the following Table III.

TABLE III

| | SAMPLE 1 | SAMPLE 2 | SAMPLE 3 | SAMPLE 4 | SAMPLE 5 | SAMPLE 6 | SAMPLE 7 | SAMPLE 8 |
|---|---|---|---|---|---|---|---|---|
| EPOXY RESIN | | | | | | | | |
| ALIPHATIC DIEPOXIDE A, % | 50 | 50 | 75 | 75 | 100 | 100 | 0 | 0 |
| ALIPHATIC DIEPOXIDE B, % | 0 | 0 | 0 | 0 | 0 | 0 | 100 | 100 |
| AROMATIC DIEPOXIDE A, % | 50 | 50 | 25 | 25 | 0 | 0 | 0 | 0 |
| EEW OF ADVANCED RESIN | 1765 | 1765 | 1900 | 1900 | 1765 | 1765 | 3230 | 3230 |
| CURING AGENT | | | | | | | | |
| BLOCKED ISOCYANATE | No | Yes | No | Yes | No | Yes | No | Yes |
| AMINOPLAST | Yes | No | Yes | No | Yes | No | Yes | No |
| THICKNESS, mils | 3.5–5.3 | 5.2–6.7 | 3.0–3.7 | 4.7–6.2 | 3.5–4.2 | 4.7–6.7 | 2.8–3.3 | 3.7–4.7 |
| , mm | 0.089–0.135 | 0.132–0.170 | 0.076–0.094 | 0.119–0.158 | 0.089–0.107 | 0.119–0.170 | 0.071–0.084 | 0.094–0.119 |
| GRAVELOMETER RATING | 7+ | 8+ | 8− | 8 | 7 | 8 | 7 | 7 |

| | SAMPLE 9 | SAMPLE 10 | SAMPLE 11 | SAMPLE 12 | SAMPLE 13 | SAMPLE 14 | SAMPLE 15 | SAMPLE 16 |
|---|---|---|---|---|---|---|---|---|
| EPOXY RESIN | | | | | | | | |
| ALIPHATIC DIEPOXIDE A, % | 0 | 0 | 0 | 0 | 0 | 0 | 0 | 0 |
| ALIPHATIC DIEPOXIDE B, % | 100 | 100 | 100 | 100 | 100 | 100 | 100 | 100 |
| AROMATIC DIEPOXIDE A, % | 0 | 0 | 0 | 0 | 0 | 0 | 0 | 0 |
| EEW OF ADVANCED RESIN | 1010 | 1010 | | | | | | |
| CURING AGENT | | | | | | | | |
| BLOCKED ISOCYANATE | No | Yes | No | No | No | Yes | No | Yes |
| AMINOPLAST | Yes | Yes | Yes | Yes | Yes | No | Yes | No |
| THICKNESS, mils | 1.7–2.7 | 1.7–3.7 | 3.1–3.5 | 3.2–5.2 | 2.7–3.5 | 2.9–5.2 | 3.3–4.7 | 3.7–5.2 |
| , mm | 0.043–0.069 | 0.043–0.094 | 0.079–0.089 | 0.081–0.132 | 0.069–0.089 | 0.074–0.132 | 0.084–0.119 | 0.094–0.132 |
| GRAVELOMETER RATING | 5 | 7 | 7 | 8− | 8− | 7 | 7+ | 9− |

| | SAMPLE 17 | SAMPLE 18 | SAMPLE 19 | SAMPLE 20 | SAMPLE 21 | SAMPLE 22 | SAMPLE 23 | SAMPLE 24 |
|---|---|---|---|---|---|---|---|---|
| EPOXY RESIN | | | | | | | | |
| ALIPHATIC DIEPOXIDE A, % | 50 | 50 | 75 | 75 | 100 | 100 | 0 | 0 |

TABLE III-continued

|  |  |  |  |  |  |  |  |  |
|---|---|---|---|---|---|---|---|---|
| ALIPHATIC DIEPOXIDE B, % | 0 | 0 | 0 | 0 | 0 | 0 | 100 | 100 |
| AROMATIC DIEPOXIDE A, % | 50 | 50 | 25 | 25 | 0 | 0 | 0 | 0 |
| EEW OF ADVANCED RESIN | 1765 | 1765 | 1900 | 1900 | 1765 | 1765 | 3230 | 3230 |
| CURING AGENT |  |  |  |  |  |  |  |  |
| BLOCKED ISOCYANATE | No | Yes | No | Yes | No | Yes | No | Yes |
| AMINOPLAST | Yes | No | Yes | No | Yes | No | Yes | No |
| THICKNESS, mils | 4.8–6.5 | 9.3–11.2 | 6.5–7.9 | 8.7–11.7 | 5.4–6.3 | 7.2–8.2 | 4.7–5.3 | 6.7–9.7 |
| , mm | 0.122–0.165 | 0.236–0.285 | 0.165–0.201 | 0.221–0.297 | 0.137–0.160 | 0.119–0.135 | 0.170–0.246 |  |
| GRAVELOMETER RATING | 7+ | 9 | 7+ | 9 | 8 | 9 | 7− | 8+ |

|  | SAMPLE 25 | SAMPLE 26 | SAMPLE 27 | SAMPLE 28 | SAMPLE 29 | SAMPLE 30 | SAMPLE 31 | SAMPLE 32 |
|---|---|---|---|---|---|---|---|---|
| EPOXY RESIN |  |  |  |  |  |  |  |  |
| ALIPHATIC DIEPOXIDE A, % | 0 | 0 | 0 | 0 | 0 | 0 | 0 | 0 |
| ALIPHATIC DIEPOXIDE B, % | 100 | 100 | 100 | 100 | 100 | 100 | 100 | 100 |
| AROMATIC DIEPOXIDE A, % | 0 | 0 | 0 | 0 | 0 | 0 | 0 | 0 |
| EEW OF ADVANCED RESIN | 1010 | 1010 |  |  |  |  |  |  |
| CURING AGENT |  |  |  |  |  |  |  |  |
| BLOCKED ISOCYANATE | No | Yes | No | Yes | No | Yes | No | Yes |
| AMINOPLAST | Yes | No | Yes | No | Yes | No | Yes | No |
| THICKNESS, mils | 3.1–4.3 | 3.7–5.7 | 4.8–5.5 | 4.7–6.7 | 4.5–5.1 | 3.7–6.2 | 4.9–5.9 | 5.7–8.2 |
| , mm | 0.79–0.109 | 0.094–0.145 | 0.122–0.140 | 0.119–0.170 | 0.114–0.130 | 0.094–0.158 | 0.125–0.150 | 0.145–0.208 |
| GRAVELOMETER RATING | 5 | 7 | 8− | 8− | 8+ | 9 | 9− | 8+ |

We claim:

1. A coating composition comprising
   (I) an advanced epoxy resin composition prepared by reacting in the presence of a suitable catalyst
      (A) a composition comprising
         (1) at least one aliphatic diepoxide and
         (2) optionally at least one aromatic diepoxide; with
      (B) at least one compound having two aromatic hydroxyl groups per molecule and an average molecular weight of at least about 188; wherein components (A-1) and (A-2) are employed in quantities such that from about 10 to about 100 percent of the epoxide equivalents contained in component (A) are contributed by component (A-1); from about 0 to about percent of such epoxide equivalents are contributed by component (A-2) and wherein components (A) and (B) are present in a quantity which provides an advanced epoxy resin having an EEW of from about 350 to about 15,000;
   (II) a curing quantity of at least one curing agent for component (I) selected from the group consisting of blocked and unblocked polyisocyanates; and
   (III) at least one solvent in a sufficient quantity such that the coating composition including components (I), (II), (III) and any other desirable component has a suitable application viscosity.

2. A coating composition of claim 1 wherein
   (i) components (I-A) and (I-B) are present in quantities which provide an advanced epoxy resin having an EEW of from about 500 to about 7500 and
   (ii) component (I-A-1) is present in quantities such that from about 50 to about 100 percent of the epoxide equivalents contained in component (I-A) are contributed by component (I-A-1).

3. A coating composition of claim 2 wherein
   (i) components (I-A) and (I-B) are present in quantities which provide an advanced epoxy resin having an EEW of from about 500 to about 6000 and
   (ii) component (I-A-1) is present in quantities such that from about 75 to about 100 percent of the epoxide equivalents contained in component (I-A) are contributed by component (I-A-1).

4. A coating composition of claim 3 wherein
   (a) component (I-A-1) is a diglycidyl ether of a polyoxypropylene glycol said polyoxypropylene glycol having an average molecular weight of from about 200 to about 400 or dipropylene glycol or a mixture thereof;
   (b) component (I-A-2) is a diglycidyl ether of a bisphenol and
   (c) component (I-B) is a bisphenol.

5. A coating composition of claim 4 wherein
   (a) component (I-A-1) has an average epoxide equivalent weight of from about 120 to about 260;
   (b) component (I-A-2) is a diglycidy ether of bisphenol A; and
   (c) component (B) is bisphenol A.

6. A coating composition of claim 5 wherein said curing agent is a blocked polyisocyanate.

7. A coating composition of claim 6 wherein said blocked polyisocyanate is a ketoxime blocked isocyanate.

8. An article comprising a substrate having (1) a first or primer coating layer, (2) an anti-chip coating comprising a composition of claim 1 and (3) one or more subsequent coatings having a composition different from (1) and (2).

9. An article comprising a substrate having (1) a first or primer coating layer, (2) an anti-chip coating comprising a composition of claim 2 and (3) one or more subsequent coatings having a composition different from (1) and (2).

10. An article comprising a substrate having (1) a first or primer coating layer, (2) an anti-chip coating comprising a composition of claim 3 and (3) one or more subsequent coatings having a composition different from (1) and (2).

11. An article comprising a substrate having (1) a first or primer coating layer, (2) an anti-chip coating comprising a composition of claim 4 and (3) one or more subsequent coatings having a composition different from (1) and (2).

12. An article comprising a substrate having (1) a first or primer coating layer, (2) an anti-chip coating comprising a composition of claim 5 and (3) one or more subsequent coatings having a composition different from (1) and (2).

13. An article comprising a substrate having (1) a first or primer coating layer, (2) an anti-chip coating comprising a composition of claim 6 and (3) one or more subsequent coatings having a composition different from (1) and (2).

14. An article comprising a substrate having (1) a first or primer coating layer, (2) an anti-chip coating comprising a composition of claim 7 and (3) one or more subsequent coatings having a composition different from (1) and (2).

15. An article comprising a substrate having (1) a first or primer coating layer comprising a coating composition of claim 1 and (2) one or more subsequent coatings having a composition different from (1).

16. An article comprising a substrate having (1) a first or primer coating layer comprising a coating composition of claim 2 and (2) one or more subsequent coatings having a composition different from (1).

17. An article comprising a substrate having (1) a first or primer coating layer comprising a coating composition of claim 3 and (2) one or more subsequent coatings having a composition different from (1).

18. An article comprising a substrate having (1) a first or primer coating layer comprising a coating composition of claim 4 and (2) one or more subsequent coatings having a composition different from (1).

19. An article comprising a substrate having (1) a first or primer coating layer comprising a coating composition of claim 5 and (2) one or more subsequent coatings having a composition different from (1).

20. An article comprising a substrate having (1) a first or primer coating layer comprising a coating composition of claim 6 and (2) one or more subsequent coatings having a composition different from (1).

21. An article comprising a substrate having (1) a first or primer coating layer comprising a coating composition of claim 7 and (2) one or more subsequent coatings having a composition different from (1).

* * * * *